Figure 1:
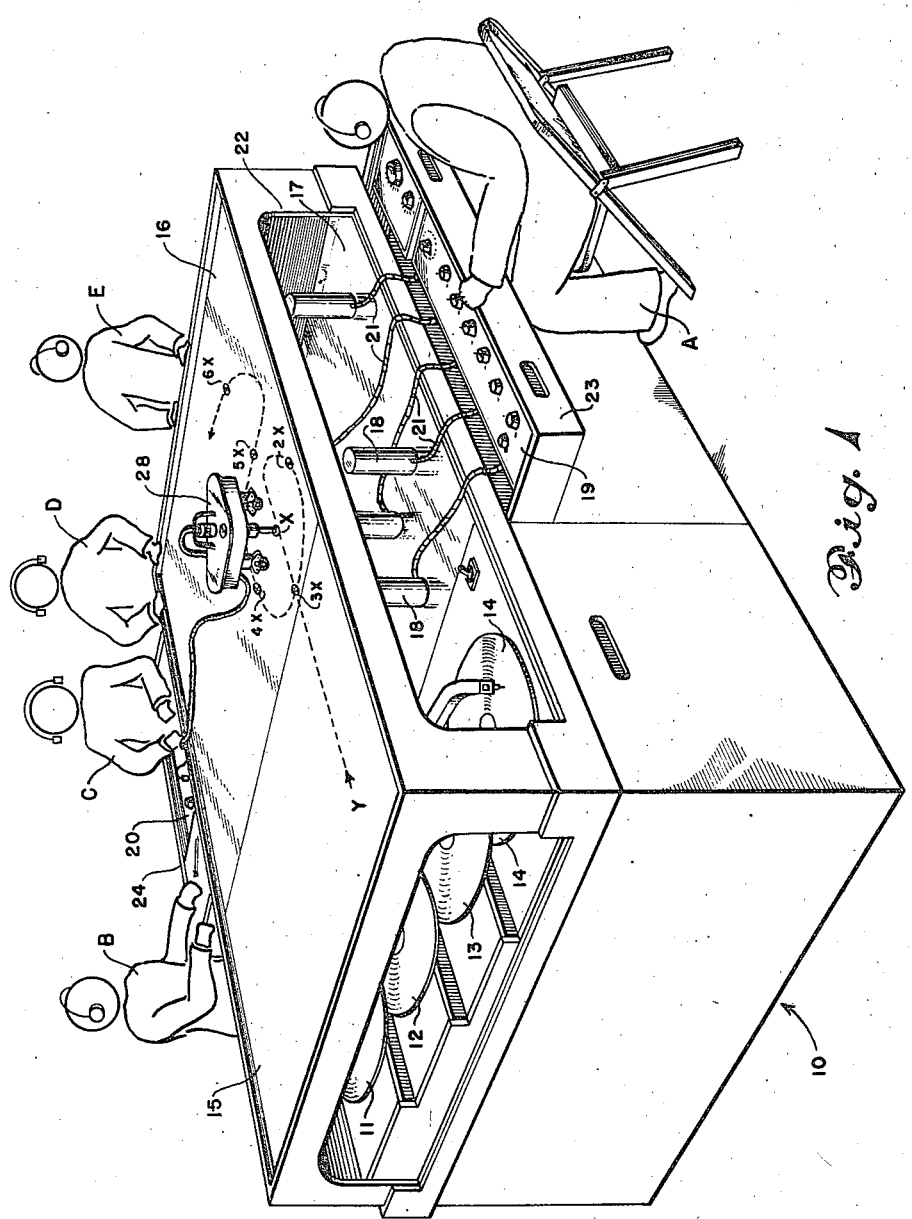

Dec. 31, 1957

B. M. TAYLOR ET AL
TRAINING DEVICE FOR OPERATORS OF
UNDERWATER DETECTION APPARATUS 2,817,909

Filed Jan. 22, 1946

3 Sheets-Sheet 1

INVENTOR.
HENRY C. KNUTSON
BYRON M. TAYLOR

BY

*M. O. Hayes*

ATTORNEY

Dec. 31, 1957 B. M. TAYLOR ET AL 2,817,909
TRAINING DEVICE FOR OPERATORS OF
UNDERWATER DETECTION APPARATUS
Filed Jan. 22, 1946 3 Sheets-Sheet 2

INVENTOR.
HENRY C. KNUTSON
BYRON M. TAYLOR
BY
ATTORNEY

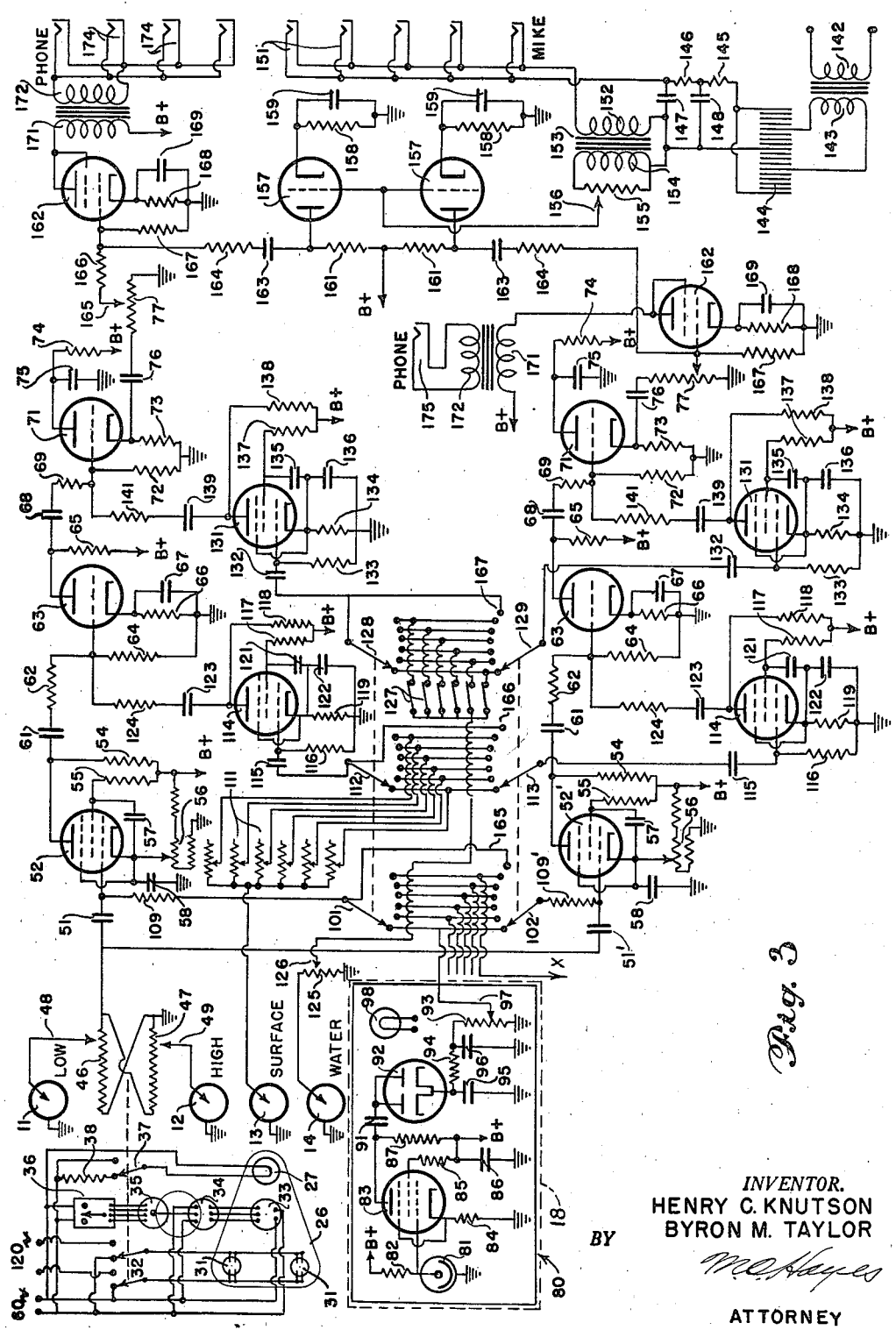

2,817,909

**TRAINING DEVICE FOR OPERATORS OF UNDER-
WATER DETECTION APPARATUS**

Byron M. Taylor and Henry C. Knutson,
United States Navy

Application January 22, 1946, Serial No. 642,783

14 Claims. (Cl. 35—10.4)

(Granted under Title 35, U. S. Code (1952), sec. 266)

The present invention relates to synthetic training devices. More specifically, it relates to a synthetic trainer designed to teach aircraft crews the use and operation of sono-buoy equipment.

Sono-buoy equipment is apparatus whereby patrol aircraft locate submerged submarines, so that they can either attack the submarine directly, or maintain contact with the sub until surface units can be summoned to make the actual attack. A sono-buoy is essentially a floating radio transmitter having a microphone to pick up underwater sounds and transmit these sounds from the sono-buoy to a receiving set in an aircraft. In practice, a patrol plane is equipped with a number of sono-buoys so that when a submarine is known to be in a given area, the plane will drop a pattern of the buoys around the location of the submarine. It can then tune in on any buoy of the pattern and pick up underwater submarine sounds, so that the course taken by the sub can be followed and contact maintained until the attack is made.

For using this equipment a high degree of crew training is essential; since the manner of use of the equipment presupposes that the crew will be able to fly a predetermined search path and place the sono-buoys in a definite and known geometrical pattern around the position where the submarine is suspected. In addition, it is essential that the crew be familiar with the equipment to the extent that they can draw accurate conclusions as to the location of the submarine by mental comparison of the reception received from the different sono-buoys of the pattern. This naturally requires that the crew be able to distinguish the sounds made by a submarine from various other sounds present in the water, or sounds caused by the effect of waves or rough water on the transmitting unit. Also, it is essential that the crews be able instantly to distinguish sounds made by the submarine and the sounds made by surface vessels, so that they will not deceive themselves as to the presence of a submarine and so they will not lose contact with the target when surface vessels are also present in the vicinity. Moreover, it is essential that the crews of an airplane undertaking a mission of this character be able to estimate the speed of the submarine by the sound it produces in order that they can accurately estimate distances covered and thus plan an attack with a high degree of accuracy. The crews operating a patrol bomber, for example, should be trained as a group in the use of the equipment; so that all of the functions necessary to the operation of the equipment become semi-automatic in character and can be done without thought on the part of the crew members. These results can be accomplished only by repeated practice, so that the crews become so familiar with the functioning of the equipment and with the different characteristics of sounds transmitted from the buoys that they find it unnecessary to make a conscious evaluation of the combination of sounds but automatically respond and take appropriate action without time for reflection.

The problem of training crews in the use of this type of equipment is normally an extremely difficult one, since to train a crew by the use of operational equipment requires that the instructor have at his command not only a patrol plane capable of carrying the crew and equipment, but also that he has the cooperation of a submarine and of various types of surface vessels so that an actual search can be carried out and so that all of the evasive manuevers commonly used by submarines to escape an attack may be practiced as the training proceeds. The expense of any large-scale training program involving these factors is terrific, and despite the tremendous cost of the equipment, the apparatus can be used to teach only a relatively small number of students. That is, the equipment can be used to train only one crew at a time, since it is part of the training procedure that the crew operate the equipment and navigate the plane.

It is, therefore, the general aim of this invention to provide a synthetic training device for sono-buoys, so that the crew of a military aircraft can be trained in the use of this equipment without the necessity of utilizing actual aircraft or submarines and without the necessity of conducting the training in actual flight.

More specifically, it is one of the principal objects of the present invention to provide a synthetic training device wherein the operation of sono-buoy equipment is simulated; in order that the crews to be assigned to this type of work can be trained to operate the apparatus, recognize the significance of various types of signals and navigate an aircraft in accordance with the conclusions reached during their training.

A further object of the invention resides in the provision of a synthetic training device including course recording devices representing a submarine and aircraft and shiftable mechanisms representing sono-buoy transmitters, together with means for simulating the various types of sounds commonly encountered in the use of operational sono-buoy gear and means for varying the resultant sound according to the relative positions between the sono-buoy units and the submarine course recorder unit.

The foregoing objects are accomplished in the present invention by a combination of instrumentalities including course-tracing devices representing a submarine and an airplane so that these devices can both be caused to pursue characteristic courses and thus simulate the movements of an aircraft following a search pattern and the maneuvers of the submarine in an effort to avoid detection. The submarine-course tracer is controlled by the instructor, and the aircraft-course tracer is controlled by one member of the student crew. The apparatus is also provided with shiftable position markers to represent sono-buoy transmitting units and a sound system having means to reproduce various types of submarine sounds including audible interference such as underwater noises and the sounds of surface ships, together with selective electronic circuits whereby the combination of sound developed by the sound system is manually controlled by the instructor and is also automatically governed by the relative positions of the sono-buoy markers with respect to the position of the submarine-course tracer.

The description of these instrumentalities will be best understood if the functional characteristics of the operational equipment are briefly reviewed, so that the effects that are to be simulated can be kept in mind.

In duplicating the functioning of actual sono-buoy equipment, it is essential to reproduce with great accuracy the sounds characteristic of operation of these devices, since after a patrol plane has dropped its sono-buoy transmitters in a predetermined pattern, the success of the search is thereafter wholly dependent upon the skill of the crew in listening to the sounds broadcast from the various individual transmitters and in making an accurate analysis of these sounds to determine the course taken by the sub. That is, if we assume that a patrol plane has made contact with an enemy submarine and has dropped its sono-buoys in a pattern around the last known position of the sub, it is thereafter the function of the crew to listen to the sounds broadcast from the several sono-buoy transmitters and to determine the position of their target solely by an analysis of these sounds.

Since the sono-buoy transmitters include microphones to pick up the submarine noises, the volume of the signal will vary in accordance with the distance between the submarine and the individual sono-buoy in question. If the patrol-plane crew determines the submarine sounds to be diminishing at one sono-buoy, it is an indication that the submarine is moving away. Similarly, a sound of increasing volume indicates the approach of the submarine toward the position of the microphone. The intensity of the sounds is also influenced by other factors, however, since the overall volume of the sound generated by the submarine is greater at high speed than at low speed. It follows that to make an accurate estimate of the distance between the sono-buoy microphone and submarine, it is first necessary to analyze the sound and come to a conclusion as to the speed at which the submarine is moving.

In operational work, the speed of a submarine can be determined by recognition of audible characteristics, since the sound generated by the submarine is of somewhat different character when operating at a speed below the point of cavitation than when the propellers are turning at top speed. Thus to duplicate the conditions facing an aircraft crew in the use of this equipment, it is necessary to provide each of the sono-buoy markers with electrical equipment so that when the individual markers are "tuned in" by the student, the intensity of the sound in the students' phones will be dependent on the distance between the course-recording unit representing the submarine and the sono-buoy marker. Moreover, means must be provided for varying the submarine sound in the system to simulate high-speed or low-speed sounds, and to shift from one to another gradually and without a noticeable step.

Figure 2:
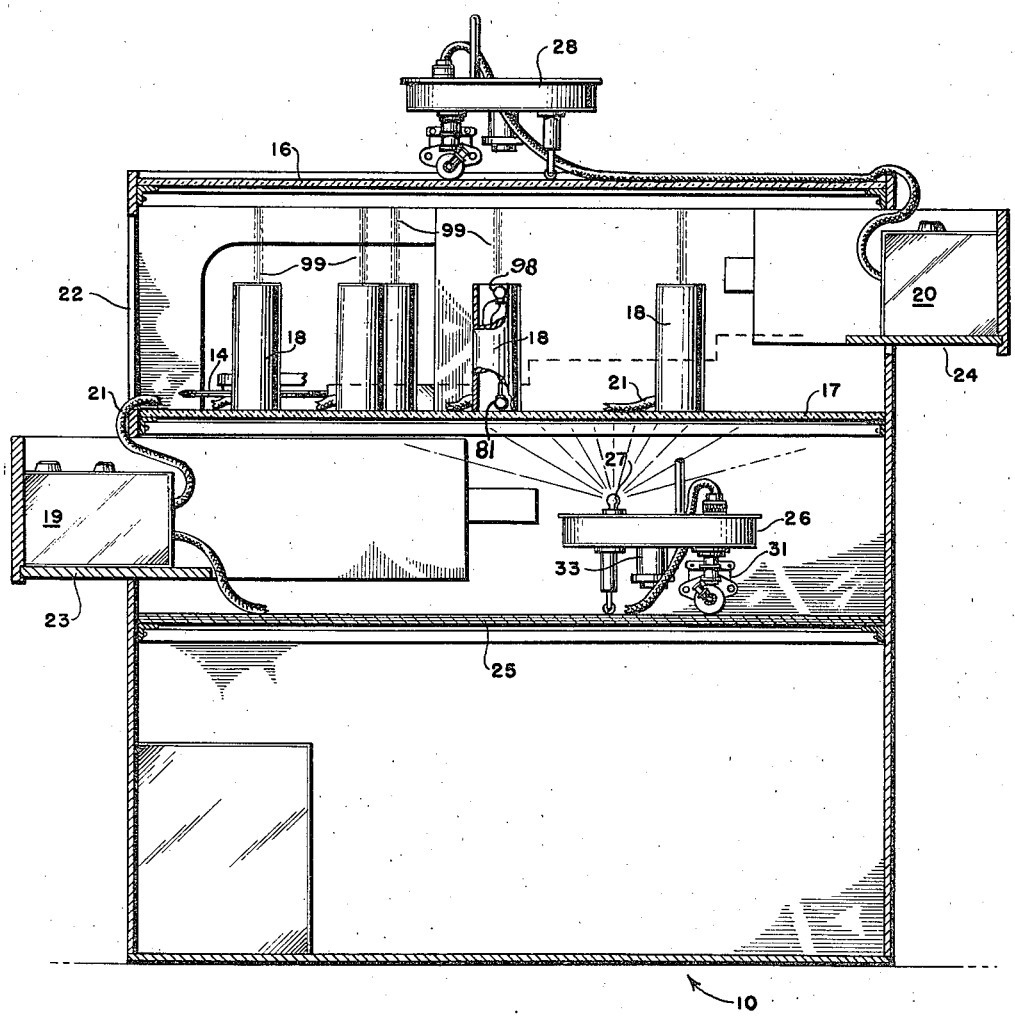
Figure 4:
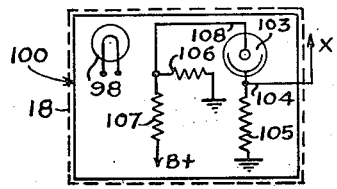

A present preferred embodiment of the invention has been chosen as a typical illustration of the inventive principles and is illustrated in the drawings attached to and forming a part of the present specification. In these drawings, Fig. 1 is a perspective view of the sono-buoy trainer illustrating the position taken by the instructor and those of the several students, Fig. 2 is a cross-sectional view through the device illustrated in Fig. 1, Fig. 3 is a schematic wiring diagram of the electrical system of the trainer, and Fig. 4 is a schematic diagram of a modification of a part of the electrical system shown in Fig. 3.

In general, the form of the invention illustrated includes a cabinet 10 provided with a plurality of phonograph turntables 11, 12, 13 and 14. Each of these turntables carries a record of sounds characteristic of sono-buoy performance. Preferably, one of the records is of submarine sounds caused by a submarine at low speeds, and a second record carries sounds caused by a submarine operating at full speed. A third record includes the sounds of various types of surface ships and a fourth record is made up of typical underwater noises commonly picked up by sono-buoy equipment.

The cabinet 10 includes a flat upper plane surface 15 with a translucent plate 16 to represent the air-search area of the device. A second transparent plate 17, simulating the water surface, is positioned below the plate 16 and serves as a support for a number of sono-buoy marker units 18 connected to the instructor's control cabinet 19 by flexible electrical leads 21. Conveniently, the wall of the cabinet 10 is cut away to form a window 22 so that the sono-buoy markers can be set in position manually by an instructor (indicated at A) seated at the control cabinet 19. The students, indicated at B, C, D, and E take positions as shown, where they can observe the plate 16 and selected pairs of students may, in turn, operate controls in the students' control cabinet 20 with one of the selected pair operating the crab controls while the other operates the receiver controls. The cabinets 19 and 20 are illustrated as being mounted within drawers 23 and 24 so that the drawers can be opened to permit access to the controls of the unit when in use, and can be closed when not in use. The cabinet 10 also includes a third flat plate 25 (Fig. 2) directly below the transparent glass plate 17. This represents the area of possible movement of the submarine. The submarine is simulated by a course tracer, or "crab" 26 that operates on the surface 25 and carries a light source 27. The airplane is simulated by a crab 28 operating on the plane area 15 and plate 16. These course-tracing units are of the general type described and illustrated in U. S. Patent 2,179,663 and, since they form no part of the invention except in connection with the other features of the apparatus, they will not be described in greater detail in this disclosure. Also, the electrical circuit by which they are controlled should be understood to be for purposes of illustration only, since it is well-known that crabs of this general type can be controlled by various means.

As will presently be shown, while one student, say the one indicated at B, operates controls affecting the crab 28, another student, say C, operates the controls of a simulated-sono-buoy radio receiver, whereby signals from individual buoy markers 18 may be switched to the headphones worn by each of the students. Suitable plan of rotation may be used to give each student an opportunity to operate these controls, in turn.

The electrical circuit of the device is illustrated in Figure 3. The circuit includes the four phonograph pick-ups 11, 12, 13 and 14, the crabs 26 and 28, together with a students' mixer and amplifier circuit and a similar circuit for the instructor. Gang switches 101, 112 and 123, and 102, 113 and 129 are provided so that each of these circuits can be individually switched to take a volume-controlling bias from any one of the various sono-buoy markers. An interphone system is incorporated into the output of both the instructors circuit and that of the students, so that speech between the various members of the crew will be superimposed on the sound of the marine noises. The effect is to simulate accurately the condition existing on the interphone system of an aircraft, wherein both intercrew communication and sono-buoy reception are simultaneously carried on. It will also be seen that the instructor may communicate with the students through the interphone.

The phonograph pickups of the trainer are connected so that the high-speed and low-speed submarine sounds are fed through a fading circuit, in order that a gradual transition can be effected between the different records. The output of the fading circuit is then fed to a mixer in which the interphone communication of the crew is superimposed on the marine sounds. The sounds of surface ships and the sounds of the various underwater noises are separately amplified and fed into the amplifier circuit so that they can be mixed with the submarine sounds and the relative volume levels of each type of sound maintained at their proper values.

The gain of the amplifier circuits is controlled by variations in bias potential applied to the grid of the first amplifier tube, and this in turn is governed by the circuit of one of the sono-buoy markers. To this end, each sono-buoy marker includes a photoelectric cell 81 actuatable by the light source 27 on the submarine course tracing crab 26 so that the amount of light received by the markers will vary in accordance with the distance between the light source on the crab and the photocell on the marker. The electrical circuit of each of the individual markers responds to variations in illumination by corresponding variations in output potential, and this potential is applied as a grid bias to the amplifier, so that the marker units are effectively used as grid-bias generators or volume control units for the amplifiers. The result is that the sound will be quite intense when the circuit is connected to a marker very close to the submarine-course tracer, and correspondingly weak when connected to a marker remote from the submarine crab. The ganged selector switches 101, 112, and 128 are provided so that the aircraft crew can shift their reception from one marker to another thereby to simulate tuning in different buoys.

The instructor's amplifier is substantially identical with the students' amplifier and is separately connected to the sound records and marker circuits, so that the instructor may connect, at will, to any individual marker regardless of the particular marker to which the student operator may, at the moment, be connected. In this manner, the instructor is able to present, for consideration of the students, the characteristics of any marker by him selected, thereby to simulate actual field conditions. Furthermore, it will be noted, that the instructor may, at will, connect to the main arms of the students' gang-switches and thus observe the operation of the student operator in his maneuvers to solve the problem posed by the instructor.

More specifically, the circuit may be described as follows: driving motors 31 of the submarine crab 26 are connected to a double-pole, switch 32 so that they can be energized by a 60-cycle input line for low-speed operation, or from a 120-cycle line (of correspondingly higher voltage) for high-speed operation. The course of the crab 26 is controlled by a selsyn repeater 33, connected to a selsyn transmitter 34 driven by a turn motor 35. The selsyn repeater and transmitter 33, 34, as well as the turn motor 35, may be of any suitable conventional type for providing remote control of the movement of crab 26. Such selsyn apparatus is well-known and fuller description thereof is deemed not necessary. The turn motor is of the reversible type, and is energized from the 60-cycle line through a reversing unit 36, so that the course of the crab 26 is set by manipulation of the control switch of the reversing unit. This switch is located at the instructor's control cabinet 19. A circuit similar to that described for controlling the movement of crab 26 is used to control the aircraft course tracer crab 28, which is controlled from the students' control cabinet 20. Inasmuch as the control circuit for crab 28 is substantially the same as that for crab 26, disclosure thereof is omitted in the interest of clarity.

The double-pole switch 32 is mechanically interconnected with a switch 37 to cut out the resistor 38 when switch 32 is moved to high speed position, thereby energizing the incandescent lamp 27 to full brilliancy. The switches 32 and 37 are also interconnected with the movable taps 48, 49 of a pair of cross-connected potentiometers 46 and 47 that control the magnitudes of the input signals from the phonograph pick-ups 11 and 12, respectively. The taps 48, 49 of the cross-connected potentiometers are adapted to be simultaneously oppositely adjusted by any suitable mechanical means thereby to constitute a fading switch or circuit for feeding graded signals from the pick-up 11 or 12 through grid condensers 51, 51' to the respective control grids of the first amplifier tubes 52, 52' of two identical amplifier circuits one for use of the students, the other for the instructor.

For simplicity of description, only the students' amplifier circuit is herein described. The tube 52 is of the pentode type, provided with a conventional plate resistor 54, screen grid resistor 55 and cathode resistor 56, as well as the screen grid condenser 57 and by-pass condenser 58.

The output from the first stage of amplification is fed through the blocking condenser 61 and resistor 62 to the grid of the second amplifier tube 63. The tube 63 is a triode having a grid leak 64 extending between the grid and ground. The plate is connected to the plate-current supply through the plate resistor 65 and the cathode resistor 66 and condenser 67 complete the amplifier circuit.

The output signal from the plate of the tube 63 is fed through the condenser 68 and resistor 69 to the third amplifier tube 71. The tube 71 is also a triode having a grid leak 72 and cathode resistor 73. The plate of the tube 71 is connected to the plate-current supply through the plate resistor 74 and a condenser 75 is connected between the plate and ground.

The signal from the tube 71 is fed through the condenser 76 and potentiometer 77 to a mixer circuit, where the various ship and sea noises are combined with the voices of the intercommunication system. However, before describing this portion of the circuit, it is deemed advisable to describe the manner in which the output volume of the amplifier is controlled as to the submarine sounds.

It is the aim of the device to generate a large volume of sound when the marker to which the circuit is switched is very close to the submarine course tracer and to reduce the output volume gradually as the distance between the submarine course tracer and the marker increases. The present invention contemplates two alternative methods of accomplishing this volume control. That is, it discloses two somewhat different circuits for the marker units, each of which, however, functions to vary the grid bias on the tubes 52, 53' in accordance with the intensity of light transmitted from the submarine course tracer to the marker unit. In the circuit generally indicated at 80, (Fig. 3) a photoelectric cell 81 has one terminal grounded. The other terminal is connected to the B power supply through a resistor 82, and to the control grid of a pentode tube 83. The tube 83 is in effect a preamplifier and is a part of a conventional amplifier circuit including a cathode resistor 84, screen grid resistor 85, condenser 86 and a plate resistor 87 through which the tube is connected to the plate power supply.

As rays of light of varying intensity strike the photoelectric cell 81, its resistance will change, causing corresponding change in the potential of the control grid of the tube 83. The plate of the tube 83 is connected through a blocking condenser 91 to the plates of a rectifier tube 92. The cathodes of this rectifier are connected to a potentiometer 93 through a filter system including the resistor 94 and condensers 95 and 96 so that the potential at the adjustable tap 97 of the potentiometer varies in accordance with the strength of the signal from the tube 83.

The circuit of the marker includes an incandescent lamp 98 (Fig. 1) which forms no part of the sound circuit but serves to throw a beam of light 99 upwardly to provide an illuminated point directly above the marker and visible on the plate 16; so that the crews being trained on the device may observe the relative positions of all of the marker units.

The tap 97 of the potentiometer 93 is connected with the first contact of the multiple point switch 101 at the students' station and a similar switch 102 at the instructor's station. The remaining switch points of these switches are connected in an identical manner with the center contacts of the potentiometers of the other marker units 18. The marker units all include identical circuits. These may be the circuit just described, or a simplified circuit, illustrated in Fig. 4, to accomplish a similar result.

As shown in Fig. 4, the simplified circuit, generally indicated at 100, includes a photoelectric cell 103 having one terminal connected to an output lead 104 and a resistor 105 having its opposite end grounded. The other terminal is connected to a lead 108 extending to a voltage divider comprising the grounded resistor 106 and the resistor 107 which is connected to the B power supply. The operating potential for the cell 103 is supplied through the lead 108, and variations of potential of the photoelectric cell are transmitted through the lead 104 to the switch points of the switches 101 and 102 and thence, as in the case of the above-described circuit 80, through resistors 109, 109' to the control grids of the students' amplifier circuit and instructor's amplifier circuit. It will thus be understood that the marker circuits of the type shown at 80 (Fig. 3) or 100 (Fig. 4) are in effect, grid-bias generators, and are utilized to effect variations in the amplitude of the signal applied to the control grids of the tubes 52, 52' in accordance with variations of the spacing between the individual markers 18 and the submarine course recorder or tracer 26.

The output of surface-ship sounds from the phonograph pick-up 13 is fed to a battery of rheostats 111 and, from the contactors of these rheostats 111, to the individual points of a switch 112 in the students' circuit and a similar switch 113 in the instructor's amplifying circuit. The switch arms 112 and 113 can be selectively positioned to contact the various points of the switch to pick up a signal of amplitude or volume corresponding to the adjustment or setting of any selected one of the individual rheostats, 111. Thus, by manipulation of the individual rheostats 111, the instructor can set up and present conditions in which simulated surface-ship noises are very prominent at some of the sono-buoys and inaudible at others.

It will again be noted that the students' amplifier circuit and the instructor's amplifier circuit are of substantially identical construction. Thus description of only the students' circuit will be made.

Surface-ship noise is fed into the amplifier circuit from the switches 112 and 113. These switch arms are each connected to the control grid of a pentode pre-amplifier 114 through a grid condenser 115 having a grid leak 116. The screen grid and plate of the tube are connected to the power supply through the screen grid resistor 117 and plate resistor 118 respectively. The cathode resistor 119 and condensers 121 and 122 complete a conventional amplifier circuit. The output signal from the pre-amplifier tube 114 is fed through the blocking condenser 123 and resistor 124 to the grid of the second stage amplifier tube 63 so that this tube functions as a mixer to combine the submarine sounds and the surface-ship sounds.

The underwater noises coming from the phonograph pickup 14 are fed through a potentiometer 125 which has its contactor 126 connected with a battery of switches 127. These switches are individually operable by the instructor, and serve to complete the circuit between the underwater noise pickup and the several switch points of the students' switch 128 and instructor's switch 129. The underwater noise signals picked up by the switches 128 and 129 are fed into the amplifier circuit at the third stage tube 71. To this end, the switch arms 128 and 129 are each connected to the control grid of a pre-amplifier pentode through a blocking condenser 132. The circuit of this pre-amplifier is identical to that of the tube 114 and includes the grid leak 133, cathode resistor 134, condensers 135 and 136, screen grid resistor 137 and plate resistor 138. The output from the tube 131 is fed through the blocking condenser 139 and resistor 141 to the grid of the third amplifier tube 71. This tube then acts as a mixer to combine the submarine and surface-ship sounds from the second stage of the amplifier with the underwater noises from the phonograph pickup 14.

The circuit includes an interphone system having a microphone and headphones for each of the crew as well as for the instructor. The interphone system is energized from an alternating-current source fed into the primary winding 142 of a transformer. The secondary winding 143 of the transformer is connected to a copper-oxide rectifier 144 and the direct current output from the rectifier is fed through a filter including the resistors 145 and 146 and the condensers 147 and 148. This power supply energizes a plurality of microphone jacks 151 in parallel with each other and in series with the primary winding 152 of the input transformer 153. The secondary winding 154 of the transformer is bridged by a volume control potentiometer 155, and the contactor 156 of the potentiometer is connected directly to a pair of triode tubes 157. Each of these tubes 157 has a cathode resistor 158 and condenser 159, and the plate of each is connected to the plate power supply through a resistor 161. The output of the tubes 157 is fed to the grids of a pair of mixer tubes 162 where the voice signals are combined with the ship and sea noises from the two amplifier circuits. To this end, the plates of the tubes 157 are connected to the grids of the tubes 162 through the blocking condensers 163 and resistors 164. The grids of the tubes 162 are also connected to the contactors of the output potentiometers 77 through the resistors 166. The tubes 162 are of the tetrode type and are each provided with a grid leak 167, cathode resistor 168 and cathode condenser 169. The screen grid and plate are joined and connected to the primary winding 171 of an output transformer and the opposite end of the winding 171 is connected to the power supply to complete the circuit. The secondary winding 172 of each output transformer is connected to the phones of the instructor and crew: that is, the circuit from the students' amplifier extends to four phone jacks 174 to provide connections for all of the students' phones but the output from the instructor's channel includes only the single jack 175 for a single set of phones.

The switches 101, 112, and 128 of the students' amplifier circuit are mechanically ganged together so that each switch arm will be positioned on the contact corresponding to the same sono-buoy marker and the gang switch can be shifted to any one of six points corresponding to the six different marker units. Thus the reception obtained when the student is "tuned in" on different marker circuits will vary in accordance with the distance between that particular marker and the light source carried by the submarine course tracer. The intensity of the underwater sounds and surface vessel sounds also varies with the different marker units since the surface vessel sounds are individually controlled by a separate rheostat 111 for each marker and the separate switches 127 serve to cut in the underwater noises on the markers that have been placed in the field of search.

The individual switch arms 102, 113 and 129 of the instructor's circuit are also mechanically ganged to permit the instructor to tune in on any marker circuit irrespective of the circuit tuned in by the students.

The gang switch associated with the instructor's amplifier includes the additional contacts 165, 166 and 167 which are directly connected to the switch arms 101, 112, and 128 respectively so that the instructor may throw the switch to this seventh point to monitor the reception in the students' amplifier circuit and determine the identity of the marker unit to which the students are listening. Thus, it is apparent that the instructor's circuit is a monitor circuit.

*Operation.*—The operation of the device is as follows: The instructor A and crew of students B, C, D, and E assume their positions at the instructor's control panel 19 and students' control panel 20 as indicated in Figure 1. All personnel are provided with microphones plugged into the jacks 151 and the students each have headphones plugged into one of the jacks 174. The instructor's headset is plugged into the jack 175.

The phonograph pickups 11, 12, 13 and 14 are put in operation and the instructor is ready to set up a search problem. In setting up the problem, the instructor can manually position the crabs 26 and 28 at any point and will then speak over the intercommunication system to instruct the crew to begin their search. For example, the instructor may position the crab 26 immediately below the point X (see Fig. 1) and place the crab 28 at the point Y. He will then speak through the interphone and report to the crew that a submarine has been sighted at point X. The location of point X can be identified in any conventional manner, as by an assumed latitude and longitude in a known search area.

It is now the responsibility of the crew to navigate the airplane crab 28 to the vicinity in which the submarine was sighted, locate the sub, and maintain contact with it as it attempts evasive maneuvers. A typical course under the conditions stated would be for the crew to navigate the crab 28 directly to the point X and to begin the search by simulating the dropping of the first sono-buoy at the point where the submarine had been sighted. This is simulated by maneuvering the crab 28 until the tracer wheel of the crab lies directly on the point X.

At this time, the pilot of the crew speaks into the interphone system and directs that the first sono-buoy be dropped. The instructor responds by manually placing a sono-buoy marker corresponding to the first point on the amplifier gang switch directly below the position of the crab 28 at the instant the command is given. The accurate positioning of the marker unit is facilitated by a ray of light 99 projected vertically upwardly from the lamp 98 in the marker circuit, as in Fig. 2. This not only aids in accurate positioning of the markers, but provides a visual reference so that the airplane crew can know the location of the marker unit. In this respect, it simulates the use of operational sono-buoy equipment since, if desired, the actual location of a sono-buoy transmitter on the water can be marked by a dye slick so that the position of the markers can be visually observed from the patrol plane. Since the submarine may have moved away from point X while the airplane crab was covering the distance from Y to X, the aircraft crew will proceed to drop a pattern of sono-buoys so that the course taken by the submarine crab can be determined by switching to the various sono-buoy marker units and noting the intensity of submarine sounds picked up at the different positions.

In duplicating operational procedure with the trainer, the pilot of the aircraft crew may begin a standard 180° turn and describe a semi-circle to bring the crab to the point 2X at which a second marker will be dropped. The pattern illustrated can be completed by continuing with a half-rate turn so that the course of the crab will pass through the position 3X, 4X, and 5X and dropping one of the marker units at each of these points. The actual speeds of the submarine course recorder 26 and aircraft-course recorder 28 are exactly proportional to the relative speeds between an actual aircraft and a submerged submarine. Thus, although the submarine crab may undertake evasive maneuvers, the speed of the crab 28 is sufficient so that the buoys can be dropped in a pattern around the maximum range of the sub, and the instructor can now maneuver the submarine crab to simulate efforts that a submarine crew might make to escape from the pattern. For example, the submarine at X may attempt to escape by moving directly away from the point Y. However, this course will pass directly under the point of 5X at which one of the buoys is located. As the submarine crab approaches this point, the light source 27 carried by the crab will energize the photoelectric cell of the sono-buoy marker unit and this energization will become greater until it reaches a maximum when the submarine crab is directly below the marker. The marker circuit serves to vary the gain of the amplifier circuits, so that as the submarine crab approaches the marker the volume of submarine sounds heard when the amplifiers are connected to the marker at 5X will gradually increase and it will decrease correspondingly when the circuits are switched to markers at other positions. Thus, the crew can determine the course taken by the submarine in the same manner as when using operational equipment in the field. When the crab passes beyond the outer limits of the pattern, they can drop a marker at some point ahead of the sub, such as 6X, so that it will again be surrounded by a pattern of several markers and the course of the submarine can thus be traced as it moves in any direction under the field of search.

The operation of the synthetic equipment here described requires the same exercise of judgment required to follow the course of a submarine by the use of actual sono-buoy transmitters. However, in the use of actual transmitters the problem may be complicated by the presence of surface-vessel sounds and may be further complicated by the fact that the submarine can operate at high or low speeds and that the volume of sound picked up by the transmitters varies with the speed of the submarine as well as with its distance from the marker. These complications are introduced into the training of the crews on the present trainer by manipulation of one or more of the rheostats 111 so that surface-ship sounds of any desired volume can be introduced to any one of the marker circuits at will. Also, the resistance 38 varies the intensity of the light source 27, so that the intensity of the light increases when the speed of the submarine is increased, and decreases when the speed of submarine is reduced. In addition, the characteristics of the submarine sound introduced into the circuits are varied by the manipulation of the cross ganged potentiometers 46—47, so that the crew is called upon to recognize the difference between the high-speed sounds and low-speed sounds by their audible characteristics and thus be able to draw conclusions as to the range of the submarine from the buoy.

The instrumentalities disclosed in this application make it possible to give effective training in the use of sono-buoy equipment without the necessity of utilizing aircraft in actual flight or tying up urgently needed sono-buoy equipment for training purposes. Moreover, the training accomplished by the device here disclosed has many points of advantage over training with operational gear, because any possible situation can instantly be set up and the students can be presented with any type of problem that can possibly be encountered in operations.

Moreover, these problems can be set up without the use of actual submarines or surface vessels, and without the necessity for consuming the fuel required for the operation of these vessels.

The exact form of the invention described here and illustrated in the drawings is a preferred embodiment of the inventive thought, and is chosen as being a typical illustration of the inventive principles of the device, but it is recognized that it is subject to many modifications and variations without departing from the inventive concept as defined by the appended claims.

The invention, if patented, may be manufactured and used by or for the Government for governmental purposes without the payment to us of any royalties thereon.

Having thus described the invention, what we claim as new and desire to secure by United States Letters Patent is:

1. In a training device, a student's station, an operator's station, a plurality of plates superimposed above each other and adapted to represent an area of search, means including a first traveling course recorder movable about one of said plates, a second traveling course recorder movable about another of the plane surfaces, a plurality of shiftable marker units adapted to be positioned at various points in the field of movement of the course recorders, instrumentalities at the student's station to control the movement of the first course recorder, instrumentalities at the instructor's station to control the movement of the second course recorder, a sound circuit including a plurality of audio frequency wave sources, amplifier means coupled to said sources, and a gain control system including a plurality of separate gain control circuits, each circuit including instrumentalities on one of the marker units to govern the degree of gain, said instrumentalities comprising a photocell at each marker unit and a grid bias generator circuit governed by each photocell, means at the student's station for selectively connecting any of said gain control circuits to said amplifier means, together with a common means for influencing all of the said circuits, said means comprising a light source carried by said second course recorder, the sound circuit also including a fading circuit interposed between the audio frequency wave sources and said amplifier means, with means responsive to changes of speed of said second course recorder to vary the adjustment of the fading circuit, together with a monitor circuit having separate amplifier means in parallel with the sound circuit and having a sound reproducer at the operator's station, and means at the operator's station for selectively connecting any one of the above-mentioned gain control circuits to said separate amplifier means of the monitor circuit.

2. In an acoustic training device for instruction in recognition of sounds, the combination of a student's station, an instructor's station, a plurality of recorded sound tracks including a record of the sound of a mechanism operating at a low speed, a record of the sound of the same mechanism operating at high speed, and at least one record of interfering sounds; together with a mixer circuit having a sound reproducer at the student's station: means for modulating the input to the mixer circuit including a fading device coupling the input from both the high speed and low speed sound tracks to the mixer circuit, said fading circuit including means for governing the degree of modulation introduced to the mixer circuit from each of the sound tracks for effecting gradual transition from one of said sound tracks to the other, and a separate and independent volume control to govern the degree of modulation introduced into the mixer circuit from the record of interfering sounds; together with a monitor circuit parallel to the mixer circuit and modulated by the same sound tracks, said monitor circuit including a sound reproducer at the instructor's station; an intercommunication system including microphones at both the student's station and instructor's station, and means for modulating the output from both the mixer circuit and the monitor circuit by the functioning of said microphones.

3. In an acoustic training device for instruction in recognition of sounds, the combination of a student's station, an instructor's station, a plurality of recorded sound tracks including a record of the sound of a mechanism operating at a low speed, a record of the sound of the same mechanism operating at high speed, and at least one record of interfering sounds; together with a mixer circuit including amplifier means and a sound reproducer at the student's station: means for modulating the input to the student's amplifier means including a fading circuit coupling the high speed and low speed sound tracks to said amplifier means; said fading circuit including means for governing the degree of modulation introduced to said amplifier means to effect gradual transition from one of said sound tracks to the other; and separate means for controlling the degree of modulation introduced into the mixer circuit from the record of interfering sounds; together with a monitor circuit parallel to the mixer circuit and modulated by the same sound tracks, said monitor circuit including a sound reproducer at the instructor's station; and an intercommunication system including microphones at both the student's station and instructor's station and means for modulating the output of the student's amplifier means, the instructor's circuit and the monitor circuit in accordance with the audio input to said microphones.

4. In a training device including a traveling course recorder adapted to be propelled at variable speeds, the combination of a sound circuit, amplifier means therefor, control means for varying the gain of said amplifier means, and means responsive to changes in speed of the course recorder to alter the degree of gain in said amplifier means.

5. In a device of the class described including a traveling course recorder having motive means for propelling the recorder at variable speeds, the combination of a sound circuit including a plurality of audio frequency wave sources consisting of recorded sound tracks, amplifier means for said sources, a fading circuit consisting of a pair of cross-connected potentiometers selectively coupling said wave sources to said amplifier means, means for simultaneously and oppositely adjusting the potentiometer to vary the setting of the fading circuit and control the proportional volume of sound from each of the plural wave sources to said amplifier means, means for actuating said adjusting means in accordance with variation in speed of said recorder, and means responsive to changes in speed of the course recorder to alter the gain of said amplifier.

6. In a device of the class described, including a traveling course recorder adapted to be propelled at varying speeds, the combination of a sound circuit including a plurality of audio frequency wave sources, amplifier means for said sources, a fading circuit selectively coupling said wave sources to said amplifier means, means for varying the setting of the fading circuit to control the proportional volume of sound from each of the plural wave sources to the amplifier means, and means responsive to changes in speed of the course recorder to effect changes in adjustment of the fading circuit, and means to alter the degree of gain of said amplifier means.

7. In a device of the class described, including a traveling course recorder adapted to be propelled at varying speeds, the combination of a sound circuit including a plurality of audio frequency wave sources consisting of recorded sound tracks, a sound reproducer, a fading circuit consisting of a pair of cross-connected potentiometers selectively coupling said wave sources to the reproducer, and means responsive to changes in speed of the course recorder to effect changes in the setting of the said potentiometers.

8. In a device of the class described, including a motor-driven traveling course recorder having means for varying the speed of said recorder, the combination of a sound circuit including a plurality of audio frequency wave sources, a sound reproducer, a fading circuit selectively coupling said wave sources to the sound reproducer, and means responsive to changes in speed of the course recorder to effect changes in the adjustment of the fading circuit.

9. The device as in claim 8 wherein said last-named means comprises means for varying the setting of the fading circuit to control the relative volume of sound from each of the wave sources to the reproducer.

10. In combination, an electronic amplifier circuit; a plurality of separate, independent gain control circuits adapted to be selectively connected to the amplifier circuit; each control circuit including a grid bias generating system and a potential governing unit consisting of a photocell; together with a shiftable volume control device comprising a movable course recorder and a light source carried by said recorder for influencing each of the potential governing units in accordance with the proximity of the photocells to the light source.

11. The combination as in claim 10 wherein said course recorder is adapted to be propelled at variable speeds, and means for increasing the excitation of said light source in accordance with increased speed of said recorder.

12. In combination, an electronic amplifier circuit; a plurality of separate, independent gain control circuits adapted to be selectively connected to the amplifier circuit; each gain control circuit including a grid bias generating system and a potential governing unit; together with a shiftable volume control device comprising a movable course recorder and means for influencing each of the potential governing units in accordance with the proximity of the units to the course recorder.

13. Apparatus for training operators of object-detecting devices, comprising means simulating an obejct to be detected and a search craft, said object being controllably movable by an instructor in a region out of sight of a trainee, said craft being controllably movable by the trainee, photosensitive means simulating signal transmitters movably supported in a region intermediate the respective fields of movement of said craft-simulating means, and adapted to be positioned in spaced relation to said object, the spacing being in accordance with directions supplied by the trainee, means operable for providing a plurality of different signals characteristic of signals normally encountered by an operator of detecting devices, said signals being communicable to the trainee for use in controlling the movement of said craft, and means for varying the quality of said signals in accordance with the relative spacing of said transmitter-simulating means and said object.

14. An apparatus for training operators of an underwater detection device comprising means simulating an underwater craft to be detected and a search craft, the first-named craft being controllably movable by an instructor, the last-named craft being controllably movable by a trainee, photosensitive means simulating signal transmitters movably supported in a region intermediate the respective fields of movement of said craft-simulating means, and adapted to be positioned by the instructor in relation to said first-named craft, the positioning being in accordance with directions supplied by the trainee, means operable by said instructor for providing a plurality of sounds characteristic of sounds normally encountered by an operator of detection devices, said sounds being communicable to the trainee for use by the latter in directing the positioning of said transmitter-simulating means, and means for varying the quality of said sounds in accordance with the relative spacing of said transmitter-simulating means and said first-named craft.

References Cited in the file of this patent

UNITED STATES PATENTS

| | | |
|---|---|---|
| 1,731,127 | Diehl | Oct. 8, 1929 |
| 1,859,423 | Arnold | May 24, 1932 |
| 2,039,405 | Green | May 5, 1936 |
| 2,066,156 | Muffly | Dec. 29, 1936 |
| 2,206,036 | Herson | July 2, 1940 |
| 2,329,612 | Hill | Sept. 14, 1943 |
| 2,332,523 | Norden | Oct. 26, 1943 |
| 2,358,793 | Crane | Sept. 26, 1944 |
| 2,373,560 | Hanert | Apr. 10, 1945 |
| 2,375,004 | Knowles | May 1, 1945 |
| 2,444,477 | Stout et al. | July 6, 1948 |
| 2,452,038 | Crane | Oct. 26, 1948 |
| 2,459,150 | Crane et al. | Jan. 18, 1949 |

FOREIGN PATENTS

| | | |
|---|---|---|
| 454,161 | Great Britain | of 1936 |